Nov. 14, 1950   J. W. WOOLF   2,530,279
DUAL ELECTRIC MOTOR SERIES PARALLEL STARTING CIRCUIT
Filed Oct. 8, 1946
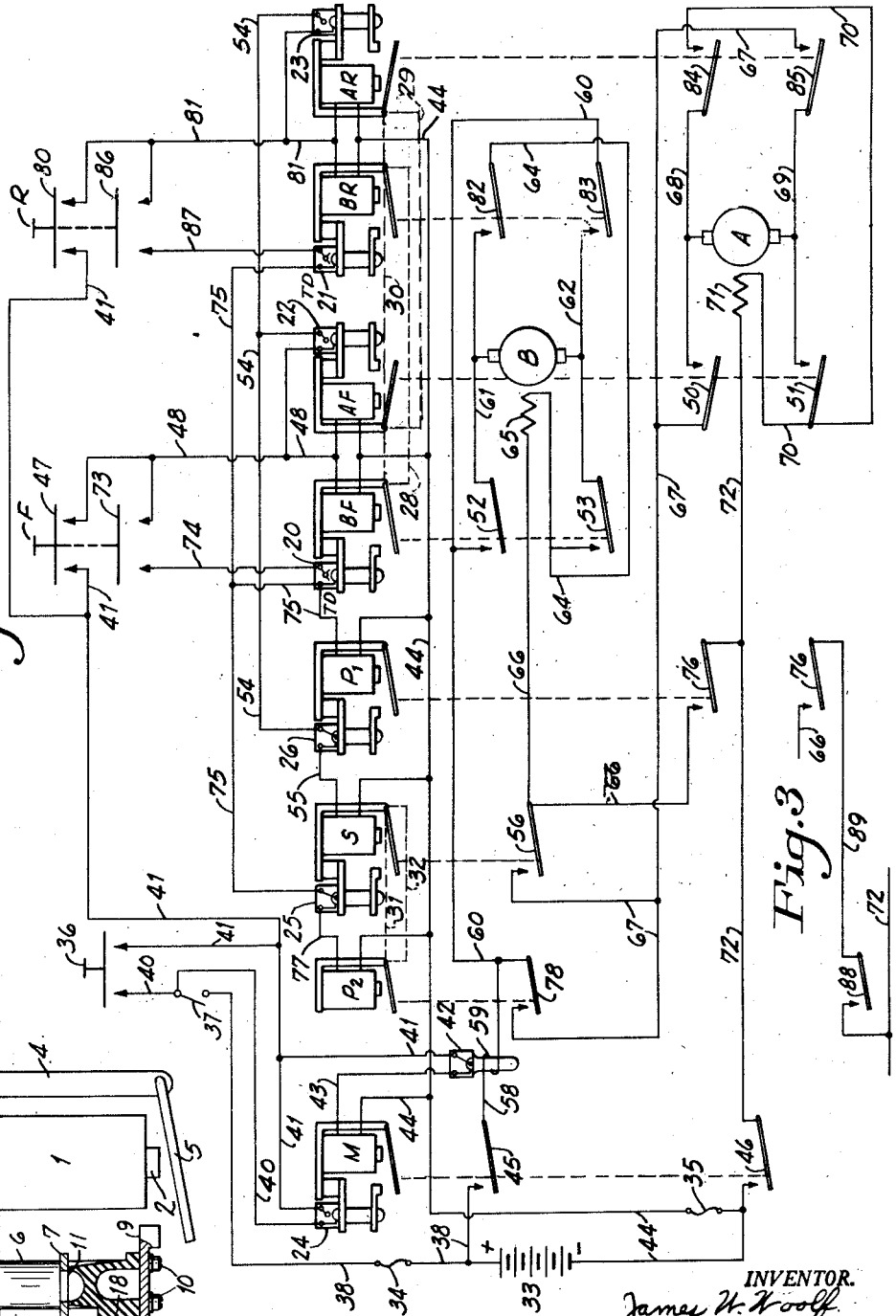
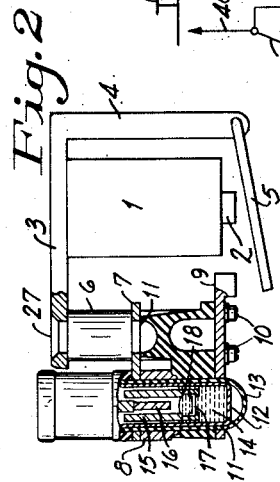
INVENTOR.
James W. Woolf
BY William D. Carothers
his Atty.

Patented Nov. 14, 1950

2,530,279

UNITED STATES PATENT OFFICE 2,530,279

DUAL ELECTRIC MOTOR SERIES PARALLEL STARTING CIRCUIT

James W. Woolf, Franklin, Pa., assignor to Joy Manufacturing Company, Pittsburgh, Pa., a corporation of Pennsylvania Application October 8, 1946, Serial No. 701,955

8 Claims. (Cl. 318—58)

This invention relates generally to dual electric motor starting circuits and more particularly to a starting circuit which first places the electric motors in series and then in parallel.

This invention may be advantageously applied to electrically driven vehicles or locomotives which are frequently started, stopped and reversed and may have a dual motor drive or independent endless track drive which is particularly adaptable as a shuttle car.

This starting circuit employs electromagnetic relays that have auxiliary magnetic liquid contactors which materially reduce the number of relays needed for the circuit and provide a novel and simplified circuit.

The principal object is the provision of a control circuit for starting and reversing a dual electric motor connection.

Another object is the provision of a dual electric motor starting circuit which places the motors in series and subsequently in parallel each time they are energized.

Another object is the provision of a dual electric motor starting circuit which places the motors in series and then in parallel after a delay determined by time or speed.

Another object is the provision of a dual electric motor starting and reversing circuit containing electromagnetic relays with dependent auxiliary magnetic liquid contactors having independent timing and operating characteristics.

Other objects and advantages appear in the following description and claims.

A practical embodiment illustrating the principles of this invention is shown on the accompanying drawing wherein:

Fig. 1 is a starting and reversing circuit diagram for a dual electric motor connection.

Fig. 2 is a sectional view of a relay with an auxiliary liquid contactor.

Fig. 3 is a fragmentary diagram showing the addition of a contact to the circuit illustrated in Fig. 1.

The circuit employed to illustrate the practical embodiment of this invention is that of a self-contained direct current unit operated from batteries. However, this circuit is equally applicable to stationary or mobile machines or to other types of sources of electric current supply. The direct current motors shown are series wound. The relays are electromagnetically operated and are preferably provided with a coil mounted on a core with parallel magnetic circuits arranged to be completed when the armature is attracted and seated by the energized coil. When deenergized the armature is biased to move away from the core and opens the contacts as well as the magnetic circuit. The parallel magnetic circuits of these relays function to actuate a liquid contactor or relay when they are closed or completed by the energization and seating of the armature. Thus these relays are indicated on the drawing as having an armature that not only closes the magnetic circuit through the core but also closes the parallel magnetic circuit for the auxiliary liquid contactor.

Referring to Fig. 2 of the drawings the electromagnetic relays are provided with the spool coil 1 mounted on the magnetic core 2 attached at their upper end to the magnetic plate 3. One magnetic path is provided by the magnetic leg member 4 attached at its upper end to the plate 3 and which pivotally supports the magnetic armature 5. The second and parallel magnetic path consists of the magnetic replacing sleeve 6, the intermediate magnetic plate 7, the intermediate magnetic gap spacer 8, and the lower magnetic plate 9, all of which are assembled and secured to the plate 3 by the screws 10. The intermediate and lower plates 7 and 9 are provided with sockets for receiving one or more liquid auxiliary contactors such as shown at 11. These electromagnetic relays, with their parallel magnetic paths for operating auxiliary liquid contactors, are referred to as controlling means.

These auxiliary switches are of the liquid contactor type comprising a sealed metal envelope or tube 12 enclosed in an insulating jacket 13 and containing a pool of electric current conducting liquid 14, such as mercury. A hollow magnetic plunger 15 within the tube 12 has a buoyant liner, if it is a normally open switch, arranged to float the plunger on the mercury pool. When a magnetic field of sufficient intensity is impressed across the fixed gap between the spacer 8 and the lower plate 9 the plunger 15 is pulled down into the pool displacing the liquid and causing it to make contact between the metal tube 12 and the central electrode 16, thus completing the circuit through this auxiliary switch. These liquid contactors are actually switch means and their operation is determined by the magnetic flux of one of the magnetic paths around the coil of the controlling means.

The auxiliary switch thus described is termed a normally open quick-acting switch as there is nothing to impede the movement of the liquid when displaced. However a valve such as shown in Fig. 2 at 17 having an orifice 18 may be provided at the lower end of the plunger 15 to restrict the flow of the liquid around the central electrode 16. When the magnetic field is applied to the tube, the plunger is pulled immediately to the bottom displacing the liquid up around the plunger but the switch will not operate until sufficient liquid has passed through the orifice 18 to make electrical contact. Thus by regulating the restricted flow of the liquid an accurate time delay action is obtained by forcing a fixed amount of liquid through a given orifice 18, which time delay is unaffected by changes in operating voltage. When the magnetic field is removed the valve 17 opens permitting the plunger to quickly return to its normal floating position and the liquid quickly recedes from around the central electrode 16.

An auxiliary contactor of this character is termed a normally open time delay closing quick opening switch. The auxiliary switches 20 and 21 of Fig. 1 are of this type as indicated by the symbols drawn in the upper portions of these switches, wherein the spread fingers of the contact above the mercury pool are meant to imply that they would resist the flow of liquid to the contact. These switches 20 and 21 are designed to close one-half second after they have been energized by the closing of their respective magnetic circuits when the energized armatures of the relays are seated.

The auxiliary contactors 22, 23 and 24 of Fig. 1 are termed normally open quick closing and opening switches. Auxiliary contactors 25 and 26 are normally closed quick opening and closing switches. In these latter switches the spacers 8 are moved adjacent the lower plate 9 and the plunger does not float. The gap is then between the spacer 8 and the intermediate plate 7 which when energized raises the plunger allowing the liquid to fall away from the central contact 16 and open the circuit when energized.

The operating characteristics of the liquid contactors are symbolically indicated on the drawings to have a pool of mercury and a contact. If the contact is shown in the pool it designates a normally closed circuit through the liquid contactor. If the contactor is shown above the pool of mercury it designates a normally open circuit liquid contactor. If the contact is plain, indicated by a dot or small circle, it designates that the liquid contactor is quick-acting in both closing and opening. On the other hand, if the contact has an arrow head the liquid contactor is quick-acting in the direction of the arrow head and time delay acting when moving in the opposite direction to that indicated by the arrow head.

The replacer sleeve 6 is removed and replaced by a gap spacer sleeve when a second auxiliary liquid contactor is placed in the socket 27. Thus a relay may have one or more auxiliary liquid contactors.

In practice adjacent relays having similar functions employ the same shaft as indicated by the dotted lines 28 and 29 and in the present instance the armatures of each pair of relays AF, BF and AR, BR are operated simultaneously but the pairs of armatures AF, AR and BF, BR are mechanically interlocked with each other as indicated by dotted line 30 to permit only one pair to operate at any one time. The shaft 31 serves as a common shaft for the adjacent armatures of the relays S and P2 but these armatures are interlocked with respect to each other as indicated by the dotted line 32.

Referring now to the circuit the vehicle in this instance is shown to carry its own power, being provided with the battery 33. The control circuits are fused at both ends as indicated at 34 and 35.

The motors being controlled are indicated as A and B. Each motor has two relays, one for forward and the other for reverse. Motor A has relays AF and AR and motor B has the relays BF and BR. The contacts of the respective relays are shown directly therebelow and when closed select the direction of the flow of current through the motor armatures to determine the direction in which they travel as the current always flows in the same direction through the series field. The relays P1 and P2 are the relays which connect the motors in parallel and the relay S is the relay that connects the motors in series. M is the master control relay.

The control circuits are initiated by the starting push button 36 and motors are driven in the forward direction by the push button F and in the reverse direction by the push button R. The F and R push buttons are preferably floor buttons in the vehicle and are disposed in opposite locations. To push the button F the operator has to be seated and facing in the forward direction or it is substantially impossible to operate it. To reverse the motor the operator has to reseat himself facing in the opposite direction for the same reason. Thus in effect these buttons are interlocked but if desirable they can be placed on a single drum that mechanically interlocks them by the position of the contacts on the drum.

When the safety switch 37 is closed and the starting button 36 is depressed the current flows from the positive terminal of the battery through the fused line wires 38 and 40, push button 36, wire 41, the normally closed overload switch 42, wire 43, coil of the relay M and return through the fused return circuit wire 44 to the negative side of the battery or source of electrical supply, whichever it may be.

The energization of the master relay M closes the magnetic circuit of the auxiliary contactor 24 completing a stick or holding circuit for the coil of the relay M between wires 40 and 41. Contacts 45 and 46 of the relay M close but the circuits to the motors A and B, of which they are a part, are not complete, so no current flows through these contacts at this time.

Assuming that push button F is depressed partway, current then continues to flow from wire 41 through the contact 47, wire 48, to the coils of the relays BF and AF, respectively, and thence to the return circuit wire 44, thereby completing the circuit of these relays causing them to be energized. The armatures of these relays are lifted closing their respective auxiliary magnetic circuits, together with their respective contacts 50, 51, 52 and 53. Current also flows from wire 48 through auxiliary contactor 22, which is closed due to the energization of relay AF, and through wire 54 to the normally closed auxiliary contactor 26, wire 55 to the coil of relay S and completes the circuit through the return wire 44, thus energizing relay S. When the relay S is energized it mechanically prevents the relay P2 from closing through the interlocking connection 32. The energization of the relay S also closes its contact 56 and opens the normally closed contact of its auxiliary contactor 25, thereby opening the circuit through the coil of the relay P2.

With the control circuits of the relays AF and BF and S energized current may then flow from the battery through the line wire 38, the contact 45 of relay M, the wire 58, the coil 59 of the overload relay 42, the wire 60, contact 52, wire 61, down through the armature of the motor B, the wire 62, the contact 53, the wire 64, the series field winding 65 of motor B, the wire 66, the contact 56, the wire 67, the contact 50, the wire 68 down through the armature of motor A, the wire 69, the contact 51, the wire 70, the series field winding 71 of motor A and the wire 72 to contact 46 and return circuit wire 44. This circuit thus directs the current through each of the series motors in the same direction and the contact 56 of the relay S places these motors in series across the line, causing them to move the vehicle in a forward direction. The motors A and B being in series provide only half voltage to each motor causing them to operate at half speed.

Further depression of the push button F causes the contact 73 to close supplying current from the wire 48 to the contact 73 and wire 74, auxiliary contactor 20, and if the relay BF has been energized for more than one-half second, wire 75 to the coil of the relay P1 and through this coil to the return wire 44. When the relay P1 is energized it closes its contact 76 and causes its normally closed auxiliary contactor 26 to open which interrupts the circuit energizing the relay S. During the time between the closing of the contact 76 and the opening of the contact 56 due to the deenergization of the relay S, the motor A has been short-circuited through the wire 67, the contact 56, the wire 66, contact 76 and the wire 72, since the wire 67 and 72 represent opposite terminals of the series motor A. At the same time that motor A is short-circuited, motor B is operated across the line as a current traveling therefrom passes through wire 66, contact 76, wire 72, contact 46, to the return circuit wire 44. Because the short circuit of the motor A through the contact 76 is for a very short period of time it does not interfere with the drive of the two motors if they are each employed to drive the wheels on both sides of the vehicle. However when employing motor A and motor B to drive a right and left hand traction member, respectively, the vehicle may give a slight turn toward that side of the vehicle driven by motor A.

As soon as the relay S becomes deenergized due to the energization of P1 its contact 56 opens and the auxiliary contactor 25 closes, thereby completing the circuit from the wire 75 through the wire 77 to the coil of the relay P2 and thence to the return wire 44 to energize the relay P2, causing its contact 78 to close. Upon the closing of the contact 78 the current flows from the wire 60 through the contact 78 to the wire 67 and thereby supplies full line current to the contact 50, the wire 68 and down through the armature A, the wire 69, the contact 51, wire 70, series field 71 of the motor A, the wire 72, the contact 46, thence to the return circuit line 44. Thus the motor A has been placed in multiple with the motor B across the lines 60 and 72 and the vehicle continues to be driven in the same direction with full line voltage across each motor.

It will be noted that the contact 73 of the push button F has a slight mechanical time delay over that of the contact member 47. However if the push button F is depressed initially to its full extent causing the contactor 73 to complete its circuit immediately after the contactor 47 has completed its circuit the auxiliary contactor 20 of the relay BF provides a half second time delay in the control circuit which maintains the starting of the motors in series at half voltage for this period of time delay before the relay P1 is energized which in turn energizes the relay P2 to place the motors in parallel across the line, each being supplied with full voltage. Thus at no time can the operator start the motors A and B without first starting them at half voltage in series after which they are automatically connected in parallel after the time delay of the auxiliary contactor 20.

With the circuit shown the operator must of course maintain the push button F in its depressed position in order to operate the motors A and B and if at any time he releases this push button and again depresses the same the motor must pass through the period of series operation with the same time delay period before they become connected in parallel across the line.

A selection of either of the two push buttons F or R of course determines the direction of movement of the vehicle. The first push button that is depressed determines the selection of either the forward or reverse movement of the vehicle. If the push button F is depressed the relays BF and AF become energized which function through the interlock 30 to prevent any operation of the relays BR and AR in case the push button R was subsequently depressed. In like manner if the push button R is depressed before the push button F the relays BR and AR become energized and prevent energization of the relays BF and AR through the interlocking mechanism 30.

Upon depressing the reverse push button R the contactor 80 permits current to flow from the wire 41 to the wire 81 to the coils of the relays BR and AR and thence to the return wire 44, thereby energizing these relays which closes their contacts 82, 83, 84 and 85, respectively. When the controllers BR and AR are energized their respective auxiliary contactors 21 and 23 also become energized, the former closing its circuit after a time delay and the latter closing immediately upon the energization of the relay AR. Current thus travels from wire 81 through the auxiliary contactor 23, wire 54 through the normally closed auxiliary contactor 26, wire 55 through the coil of the relay S and thence to the return circuit wire 44. Completion of this circuit permits current to flow through the wire 60, the contact 83, wire 62 up through the armature of the motor B, wire 61, contact 82, wire 64 to the series field winding 65 of the motor B, the wire 66, contact 56, wire 67, contact 85, wire 69 up through the armature of motor A, wire 68, contact 84, wire 70 through the series field winding of motor A and the wire 72. The motors are thus operating in series and after the time delay of the auxiliary contactor 21 the current flows through the contactor 80, wire 81, contactor 86, wire 87, the auxiliary contactor 21, wire 75 to the coil of the relay P1 and thence to the return circuit wire 44 to close its contact 76, placing the motor A and placing the motor B directly across the line. Upon the energization of relay P1 its auxiliary contactor 26 subsequently opens the circuit of the relay S which opens its contact 56 and in turn permits the auxiliary contactor 25 to close its circuit from the wire 75, the wire 77 to the coil of the relay P2 thence to the return circuit wire 44. The energization of the relay P2 thus closes its contact 78 placing the motor A and B in multiple across the line as previously described. In this manner the motors A and B have been started in reverse, they being first operated in series on half voltage through a predetermined time delay determined by the auxiliary contactor 21 and then subsequently operated in parallel on full voltage across the line.

If it is undesirable to have a momentary short on the motor A during the transition period from the series to the parallel circuit arrangement a second contact 88 may be added to the controller P2 as shown in Fig. 3 which may be connected in series with the contact 76 of the controller P1 by means of the wire 89. This circuit arrangement between the wires 66 and 72 would prevent a short circuit of the motor A by the contact 76 but would produce an open circuit condition of both motors during the transition period between the time that the contact 56 of controller S is opened and the contacts 78 and 88 of controller P2 close. However in most circuits it is preferable to short circuit the series motor A during this transition period rather than to open the motor circuits because of arcing in breaking the current load.

I claim:

1. In a dual motor running and reversing circuit, the combination of controlling means having contacts in separate circuits connected to each motor, the contacts being in each of two opposite legs of respective four-legged bridge reversing motor circuits, a contactor energized with the operation of said controlling means to close the circuit of a second controlling means which connects said motors in series, a normally open time delay closing contactor energized with the operation of the first controlling means to close a circuit and energize a third controlling means which connects together one side of said motors, a normally closed contactor actuated with the third controlling means to open the circuit of the second controlling means, a normally closed contactor actuated with the operation of the second controlling means to connect a circuit from the normally open time delay closing contactor to a fourth controlling means which connects together the other side of said motors to complete the circuit placing them in parallel.

2. In a dual motor running and reversing circuit, the combination of two motors each having a forward and a reverse controlling means each provided with a contact in each of two opposite legs of the respective four-legged bridge reversing circuits for said motors, a contactor energized with the operation of said controlling means to close the circuit of a second controlling means which connects said motors in series, a normally open time delay closing contactor energized with the operation of the first controlling means to close the circuit and energize a third controlling means which connects one side of said motors together, a normally closed contactor actuated with the third controlling means to open the circuit of the second controlling means, a normally closed contactor actuated with the operation of the second controlling means to connect a circuit from the normally open time delay closing contactor to a fourth controlling means which when energized connects the other side of said motors to place them in parallel.

3. In a dual motor running and reversing circuit, the combination of two motors each having a forward and a reverse controlling means each provided with a contact in each of two opposite legs of their respective bridge reversing motor circuits, contactors for each of said controlling means energized by the operation of their respective controlling means and consisting of a quick closing contactor for one forward and one reverse controlling means and a time delay closing contactor for the other forward and the other reverse controlling means, controlling means connected to be energized by either of the quick closing contactors which when energized connects the motors in series, controlling means for each motor connected to be energized by either of the time delay closing contactors and which when energized connects the motors in parallel, a normally closed contactor actuated by the series connecting controlling means which when energized opens the circuit of one of said parallel connecting controlling means, a normally closed contactor for the other of said parallel controlling means which when energized opens the circuit of the series connecting controlling means, and means to selectively energize the forward or reversing controlling means to start or reverse said motors whereby said motors are required to operate in series at least for the period required to operate the time delay contactors.

4. In a dual motor running and reversing circuit, the combination of two motors each having a forward and a reverse controlling means provided with a contact in each of two opposite legs of their respective bridge reversing motor circuits, four liquid contactors one of which is energized by the operation of each of said controlling means and consisting of a quick closing contactor for one forward and one reverse controlling means and a time delay contactor for the other forward and the other reverse controlling means, a fifth controlling means connected to be energized by either of the quick closing contactors for connecting the motors in series, sixth and seventh controlling means connected to be energized by either time delay closing contactor for completing the connection to place the motors in parallel, a normally closed liquid contactor energized by the operation of the fifth controlling means which when energized opens the circuit of the seventh controlling means, a normally closed liquid contactor energized by the operation of the sixth controlling means which when energized opens the circuit of the fifth controlling means to prevent the line circuit from being short circuited during the transition period from series to parallel operation of the motors in either direction.

5. The structure of claim 4 which also includes two-position switch means arranged when actuated to the first position to selectively operate the motors in series for forward or reverse operation and when actuated to the second position to selectively operate the motors in parallel for forward or reverse operation, the parallel operation of the motors requiring a series connection of said motors for at least the duration of the operation of the time delay liquid contactors.

6. The structure of claim 4 which also includes switch means to selectively energize the forward or reverse controlling means to operate the motors in series or parallel, the parallel operation of the motors requiring a series connection of said motors for at least the duration of the operation of the time delay liquid contactors.

7. In a dual motor circuit, the combination of a controlling means having contacts in separate circuits connected in each motor, a contactor energized with the operation of said controlling means to close the circuit of a second controlling means which connects said motors in series, a normally open time delay closing contactor energized with the operation of the first controlling means to close a circuit and energize a third controlling means which connects together one side of said motors, a normally closed contactor actuated with the third controlling means to open the circuit of the second controlling means, a fourth controlling means having a mechanical interlock with said second controlling means and energized by said normally open time delay closing contactor for connecting the other side of said motors together to complete placing them in parallel.

8. In a dual motor running and reversing circuit, the combination of two motors each having a forward and a reverse controlling means provided with a contact in each of two opposite legs of their respective bridge reversing motor circuits, four liquid contactors, one of which is energized by the operation of each of said controlling means and consisting of a quick-closing contactor for one forward and one reverse controlling means and a time delay contactor for the other forward and the other reverse controlling means, a fifth controlling means connected to be energized by either of the quick-closing contactors for connecting the motors in series, sixth and seventh controlling means connected to be energized by either time delay closing contactor for completing the connection to place the motors in parallel, a mechanical interlock between the fifth and seventh controlling means, a normally closed liquid contactor energized by the operation of the sixth controlling means which when energized opens the circuit of the fifth controlling means to prevent the line circuit from being short circuited during the transition period from series to parallel operation of the motors in either direction.

JAMES W. WOOLF.

REFERENCES CITED

The following references are of record in the file of this patent:

UNITED STATES PATENTS

| Number | Name | Date |
|---|---|---|
| 1,037,433 | Carichoff | Sept. 3, 1912 |
| 1,266,607 | Mardis | May 21, 1918 |
| 1,435,207 | Candee | Nov. 14, 1922 |
| 1,929,297 | Webb | Oct. 3, 1933 |
| 2,287,306 | Hedin et al. | June 23, 1942 |
| 2,317,253 | Cowin | Apr. 20, 1943 |
| 2,419,178 | Strong | Apr. 15, 1946 |
| 2,472,048 | Russell et al. | May 31, 1949 |